US008356182B2

(12) United States Patent
Teranishi (10) Patent No.: US 8,356,182 B2
(45) Date of Patent: Jan. 15, 2013

(54) ELECTRONIC SIGNATURE SYSTEM AND ELECTRONIC SIGNATURE VERIFYING METHOD

(75) Inventor: Isamu Teranishi, Tokyo (JP)

(73) Assignee: NEC Corporation, Tokyo (JP)

( * ) Notice: Subject to any disclaimer, the term of this patent is extended or adjusted under 35 U.S.C. 154(b) by 989 days.

(21) Appl. No.: 12/439,591

(22) PCT Filed: Apr. 13, 2007

(86) PCT No.: PCT/JP2007/058154
§ 371 (c)(1),
(2), (4) Date: Mar. 2, 2009

(87) PCT Pub. No.: WO2008/026345
PCT Pub. Date: Mar. 6, 2008

(65) Prior Publication Data
US 2009/0271631 A1    Oct. 29, 2009

(30) Foreign Application Priority Data

Sep. 1, 2006   (JP) .................................. 2006-237504

(51) Int. Cl.
*H04L 29/06* (2006.01)
*H04L 9/30* (2006.01)
*H04L 9/32* (2006.01)

(52) U.S. Cl. ........... 713/180; 713/170; 713/176; 380/30

(58) Field of Classification Search .................. 713/180, 713/176, 170; 380/28, 30
See application file for complete search history.

(56) References Cited

U.S. PATENT DOCUMENTS 5,493,614 A * 2/1996 Chaum .......................... 380/30
5,963,649 A * 10/1999 Sako ............................. 713/168
6,108,783 A * 8/2000 Krawczyk et al. ............ 713/180
6,292,897 B1 * 9/2001 Gennaro et al. .............. 713/175
7,567,672 B2 * 7/2009 Furukawa ..................... 380/255
2002/0038420 A1 * 3/2002 Collins et al. ................. 713/156

FOREIGN PATENT DOCUMENTS

| JP | 1997171349 A | 6/1997 |
|----|---|---|
| JP | 1997200198 A | 7/1997 |

(Continued)

OTHER PUBLICATIONS

Wenbo Mao, "New Zero-Knowledge Undeniable Signatures—Forgery of Signature Equivalent to Factorisation", Feb. 2001, pp. 1-16 http://citeseerx.ist.psu.edu/viewdoc/summary?doi=10.1.1.79.1220.*

(Continued)

*Primary Examiner* — Jung Kim
*Assistant Examiner* — Carlos M De Jesus, Jr.

(57) ABSTRACT

A key creating device creates a first public key and a first secret key of the electronic signature method satisfying the noncounterfeitability and a second public key and the first secret key of the chameleon commitment method. The signature device generates a commitment, a first random number according to the Com algorithm, and a first signature by using the first secret key. The signature device further generates a second random number according to the Cam algorithm by using the message written by adding a first signature to an object message, and creates an electronic signature by combining the first signature and the second random number. A verifying device receives the signed message written by adding the first signature included in the electronic signature to the object message, creates a commitment according to the ComVer algorithm, and performs verification by using the commitment and the first signature.

10 Claims, 11 Drawing Sheets

FOREIGN PATENT DOCUMENTS

JP   2003318884 A   11/2003
JP   2004023270 A   1/2004

OTHER PUBLICATIONS

David Chaum, "Zero-Knowledge Undeniable Signature", 2006, http://www.springerlink.com/content/qu4yw4cwup7bhcbq/.*

Dan Boneh, "Strongly Unforgeable Signatures Based on Computational Diffie-Hellman", 2006, http://crypto.stanford.edu/~dabo/papers/strongsigs.pdf.*

EPO Search report, 2011, https://register.epo.org/espacenet/application?number=EP07741590&lng=en&tab=doclist.*

International Search Report for PCT/JP2007/058154 mailed Jul. 3, 2007.

Boneh et al., "Strongly Unforgettable Signatures Based on Computational Diffie-Hellman", In Public Key Cryptography—PKC 2006, LNCS 3958, Apr. 24, 2006., pp. 229-240.

* cited by examiner

ELECTRONIC SIGNATURE SYSTEM AND ELECTRONIC SIGNATURE VERIFYING METHOD

This application is the National Phase of PCT/JP2007/058154, filed Apr. 13, 2007, which claims priority to Japanese Patent Application No. 2006-237504, filed on Sep. 1, 2006.

TECHNICAL FIELD

The present invention relates to the generation and verification of an electronic signature to be added to an electronic message.

BACKGROUND ART

Electronic signature schemes are a technology for electronically performing a task corresponding to the impression of a seal on a paper medium, i.e., a technology for affixing an electronic signature (hereinafter referred to as "electronic signature" or simply "signature") to an electronic message that is stored in an electronic medium. The importance of electronic signature schemes has been growing as the Internet has been finding widespread use.

It is important in computerized contracts and authentications typified by electronic commercial transactions that the contents of messages be not forged. Electronic signature schemes are capable of verifying whether a message with an electronic signature affixed thereto has been forged or not.

The electronic signature schemes involve two entities, i.e., a signatory and a verifier. The signatory generates an electronic signature for a message, and outputs the electronic signature together with the message. The verifier receives the electronic signature together and the message output from the signatory, and verifies the legitimacy of the electronic signature.

There are two levels of security concept for the electronic signature schemes. One is unforgeability and the other strong unforgeability.

The unforgeability means that an electronic signature for a message which a legitimate signatory has not signed in the past cannot forged by another person. With the unforgeability, therefore, the other person may possibly be able to forge an electric signature different from an electric signature which has been affixed in the past to a message by the legitimate signatory. The strong unforgeability means that the other person cannot even forge such an electric signature. Most of the existing electronic signature schemes are known to satisfy the unforgeability. However, it is not clear whether the existing electronic signature schemes are capable of satisfying the strong unforgeability.

In recent years, there has been proposed a process of converting an electronic signature scheme which satisfies the unforgeability into an electronic signature scheme which satisfies the strong unforgeability ("Strongly Unforgeable Signatures Based on Computational Diffie-Hellman" See Dan Boneh, Emily Shen, and Brent Waters, In Public Key Cryptography—PKC 2006, LNCS 3958, Springer-Verlag, 2006). The proposed process makes it possible to realize an electronic signature scheme that satisfies the strong unforgeability.

DISCLOSURE OF THE INVENTION

The process proposed in the above literature is limited to cases where the original electronic signature scheme has a special partitioned property. At present, there is only one electronic signature scheme which is known to have a special partitioned property. In addition, the electronic signature scheme is of poor efficiency, and the electronic signature scheme that satisfies the strong unforgeability, which has been converted therefrom, is also of poor efficiency and hence is not practical.

It is an object of the present invention to provide an electronic signature system for realizing an electronic signature scheme that satisfies the strong unforgeability.

To achieve the above object, an electronic signature system for verifying the legitimacy of a target message with an electronic signature generated for the target message includes a key generating apparatus, a signature apparatus, and a verification apparatus.

The key generating apparatus generates a first public key and a first secret key according to a key generating algorithm of an electronic signature scheme which satisfies the unforgeability, using a predetermined security parameter as an input. The key generating apparatus also generates a second public key and a second secret key according to a GenCam algorithm of a chameleon commitment scheme, using the security parameter as an input.

The signature apparatus generates a commitment and a first random number according to a Com algorithm of the chameleon commitment scheme, using the second public key generated by the key generating apparatus and an arbitrary message as inputs. The signature apparatus also generates a first signature according to a signature algorithm of the electronic signature scheme which satisfies the unforgeability, using the first secret key generated by the key generating apparatus as an input. The signature apparatus also generates a second random number according to a Cam algorithm of the chameleon commitment scheme, using a signature-affixed message which comprises the target message with the first signature affixed thereto, the second public key, the second secret key, the commitment, and the first random number as inputs. The signature apparatus also generates an electronic signature for the target message, which includes the first signature and the second random number.

The verification apparatus generates a commitment according to a ComVer algorithm of the chameleon commitment scheme, using signature-affixed message which comprises the target message with the first signature affixed thereto that is included in the electronic signature, the second random number included in the electronic signature, and the second public key as inputs. The verification apparatus also verifies the legitimacy of the first signature according to a verification algorithm of the electronic signature scheme which satisfies the unforgeability, using the generated commitment, the first signature, the first public key as inputs. The verification apparatus also regards a verified result as a verified result of the electronic signature.

According to the present invention, an electronic signature scheme which satisfies the strong unforgeability can be realized by combining an arbitrary electronic signature scheme which satisfies the unforgeability and the chameleon commitment scheme.

BEST MODE FOR CARRYING OUT THE INVENTION

Exemplary embodiments of the present invention will be described in detail below with reference to the drawings.

Figure 1:
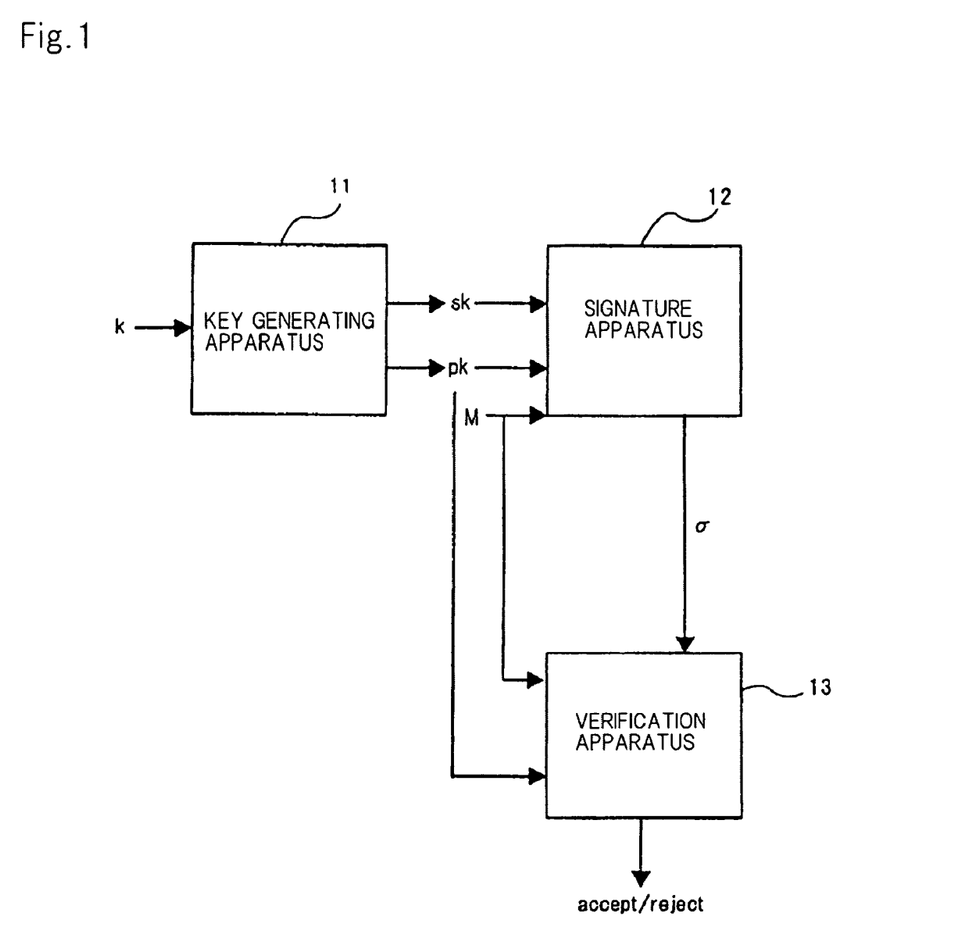
FIG. 1 is a block diagram showing the configuration of an electronic signature system according to an exemplary embodiment of the present invention.

FIG. 1 is a block diagram showing the configuration of an electronic signature system according to an exemplary embodiment of the present invention. As shown in FIG. 1, the electronic signature system according to the present exemplary embodiment comprises key generating apparatus 11, signature apparatus 12, and verification apparatus 13.

Key generating apparatus 11 has a key generating algorithm installed therein, and generates a key based on the signature algorithm. For generating a key, key generating apparatus 11 is given security parameter κ. Using security parameter κ as an input, key generating apparatus 11 outputs public key pk and secret key sk.

Signature apparatus 12 has a signature algorithm installed therein, and generates an electric signature based on the signature algorithm. Signature apparatus 12 is given public key pk and secret key sk which are generated by key generating apparatus 11, and message M to which an electric signature is to be affixed. Using public key pk, secret key sk, and message M as inputs, signature apparatus 12 outputs electronic signature σ.

Verification apparatus 13 has a verification algorithm installed therein, and verifies an electronic signature based on the verification algorithm. Verification apparatus 13 is given public key pk generated by key generating apparatus 11, electronic signature σ generated by signature apparatus 12, and message M to which electronic signature σ is affixed. Using public key pk, electronic signature σ, and message M as inputs, verification apparatus 13 verifies whether electronic signature σ is legitimate or not.

Key generating apparatus 11, signature apparatus 12, and verification apparatus 13 each have a processor, a storage, and a communication device, not shown, as hardware components. Generally, the processor comprises a CPU, and the storage comprises a memory and a hard disk. Generally, the communication device is capable of communications on the Internet. However, the processor, the storage, and the communication device are not limited to those general configurations.

Since signature apparatus 12 operates on the output, used as the input, from key generating apparatus 11, it is frequent in actual operations to employ a configuration wherein signature apparatus 12 doubles as key generating apparatus 11. However, signature apparatus 12 may not necessarily double as key generating apparatus 11. It is also frequent to employ a configuration wherein signature apparatus 12 doubles as verification apparatus 13. However, signature apparatus 12 may not necessarily double as verification apparatus 13 either.

A summary of an electronic signature scheme according to the present exemplary embodiment will be described below.

It is assumed that a person (or an organization) referred to as "signatory" owns key generating apparatus 11 and signature apparatus 12. It is also assumed that a person (or an organization) referred to as "verifier" owns verification apparatus 13. Though one signature apparatus 12 may be shared by a plurality of persons, it is assumed that there is only one user of one signature apparatus 12 for the sake of the brevity. Similarly, it is also assumed that there is only one user of one key generating apparatus 11 and there is only one user of one verification apparatus 13. However, the electronic signature scheme is also similarly applicable to cases where a plurality of persons shares an apparatus.

Figure 2:
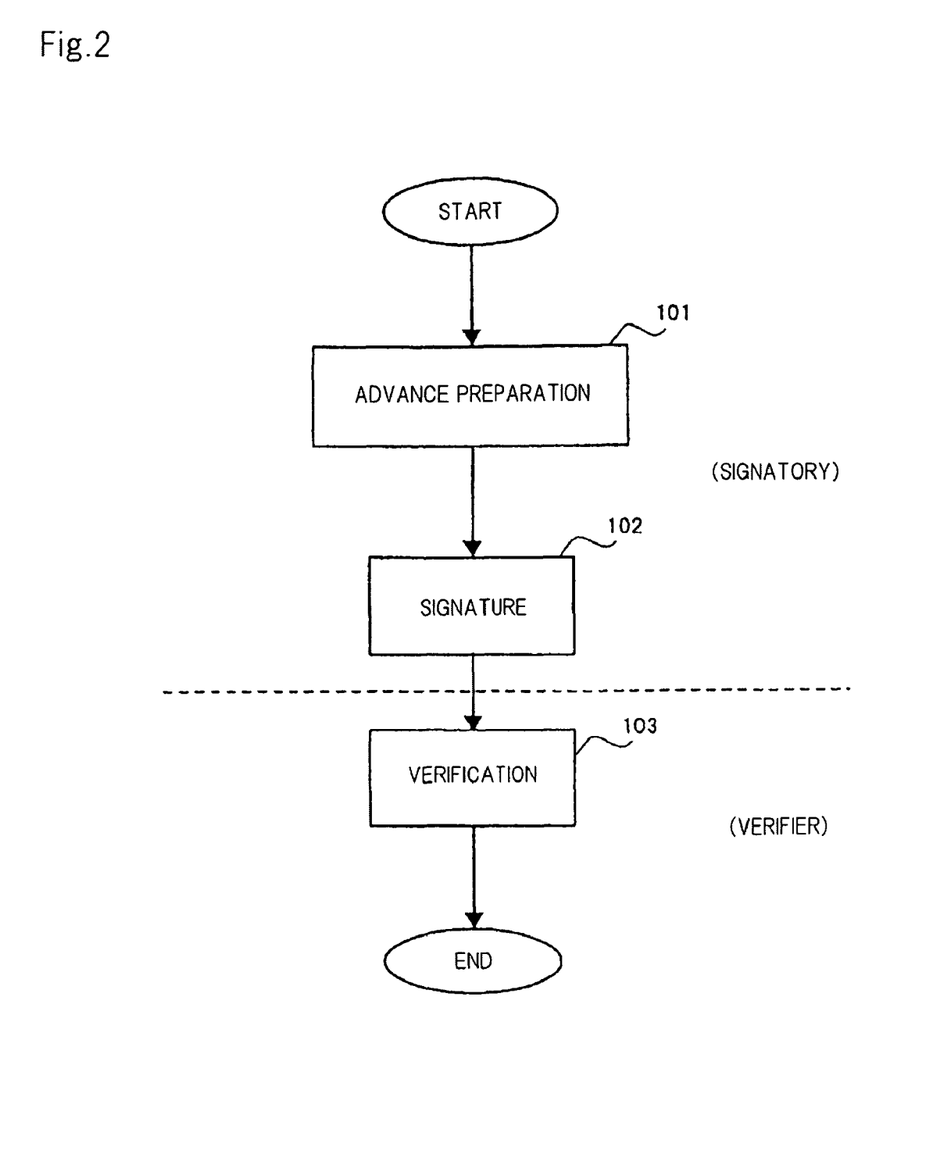
FIG. 2 is a flowchart of a general sequence of an electronic signature scheme according to the exemplary embodiment of the present invention.

FIG. 2 is a flowchart of a general sequence of the electronic signature scheme according to the present exemplary embodiment. As shown in FIG. 2, the signatory performs an "advance preparation" process (step 101). Then, the signatory performs an actual "signature" process (step 102). Finally, the verifier performs a "verification" process (step 103).

The signatory makes two actions referred to as "advance preparation" and "signature". The signatory may perform the advance preparation only once. Once the signatory has performed the advance preparation, the signatory may generate an electronic signature any number of times for a number of messages by performing the "signature".

The "advance preparation" performed by the signatory will be described below.

First, the signatory determines value k called a security parameter. Security parameter κ is a measure of how difficult it is to forge an electronic signature. The greater security parameter κ is, the more difficult to forge an electronic signature. Then, the signatory inputs security parameter κ to operate the key generating algorithm on key generating apparatus 11.

Using security parameter k as an input, key generating apparatus 11 performs the key generating algorithm to generate data pk called a public key and data sk called a secret key. Then, key generating apparatus 11 sends generated public key pk and secret key sk to signature apparatus 12. Signature apparatus 12 saves public key pk and secret key sk received from key generating apparatus 11 in the storage.

Key generating apparatus 11 discloses public key pk to other apparatus according to some process. The process of disclosing public key pk is not limited to any particular process. For example, key generating apparatus 11 may disclose public key pk using PKI (Public Key Infrastructure) or may write public key pk on a public bulletin board.

If secret key sk is known to other persons, an electronic signature can easily be forged. Therefore, signature apparatus 12 saves secret key sk secretly. The process of saving secret key sk secretly is not limited to any particular process. For example, a password may be set in signature apparatus 12 to prevent a person who is unaware of the password from using signature apparatus 12. Alternatively, signature apparatus 12 may be stored in a safe place, or secret key sk may be stored in a tamper-resistant apparatus.

The "advance preparation" performed by the signatory is now finished.

The "signature" performed by the signatory will be described below.

The signatory makes signature apparatus 12 carry out the signature algorithm. Signature apparatus 12 reads public key pk, secret key sk, and message M to be signed from the storage, generates electric signature σ using these data, and writes electric signature σ in the storage. Furthermore, upon request from the signatory, signature apparatus 12 sends message M and electric signature σ to other apparatus, using the communication device.

The "signature" performed by the signatory is now finished.

The verifier verifies electric signature σ generated for message M.

First, the verifier obtains public key pk of the signatory, message M, and electric signature σ for message M, with verification apparatus 13. Verification apparatus 13 obtains public key pk, message M, and electric signature σ through the communication device, and writes them in the storage. It is assumed that the ID of the signatory for whom public key has been generated is represented by S. The verifier intends to verify whether electric signature σ is an electric signature generated by signatory S according to a proper process or not.

The verifier makes verification apparatus 13 operate the verification algorithm. Verification apparatus 13 reads public key pk, message M, and electric signature σ from the storage, and verifies electric signature σ. Verification apparatus 13 then outputs either one of two data "accept" and "reject" as indicating the verified result.

The data "accept" means that "electric signature σ is an electric signature generated for message M by signatory S according to a proper process". The data "reject" means that "electric signature σ is not an electric signature generated for message M by signatory S according to a proper process".

The key generating algorithm, the signature algorithm, and the verification algorithm according to the present exemplary embodiment serve to realize an electronic signature scheme satisfying the strong unforgeability by integrating any arbitrary signature scheme satisfying the unforgeability and a chameleon commitment scheme.

The chameleon commitment scheme will be described below.

The chameleon commitment scheme generally employs four functions (algorithms) GenCam, Com, Cam, ComVer.

The GenCam algorithm is a function for generating public key pkcam and secret key skcam according to the chameleon commitment, using security parameter κ as an input.

The Com algorithm is a function for generating data C called a commitment and random number t, using public key pkcam and message m_0 as inputs.

The Cam algorithm is a function for generating random number r, using public key pkcam, secret key skcam, message m, commitment C, and random number t as inputs.

The ComVer algorithm is a function for generating commitment C, using public key pkcam, message m, and random number r.

The algorithms of the functions of the existing chameleon commitment scheme will be described below.

It is assumed that $\{G\_\kappa\}$ represents a genus of a group. Though any group may be selected as $G\_\kappa$, since the public key encryption scheme is employed, it is preferable that the discrete logarithm problem on $G\_\kappa$ be difficult to solve from the standpoint of security. The order of $G\_\kappa$ is represented by $q\_\kappa$, and the cyclic group of order $q\_\kappa$ by $Z\_\kappa$.

In the description which follows, the operation to raise element g of $G\_\kappa$ to xth power is referred to as $g^x$ or $g^{\{x\}}$. H has a value range represented by a bit sequence, and the bit sequence indicates a hash function of log q bits or smaller.

First, the GenCam algorithm will be described below. Security parameter κ is input to the GenCam algorithm. First, the GenCam algorithm randomly selects element g from group $G\_\kappa$ which is determined by security parameter κ, and randomly selects element x from cyclic group $Z\_\kappa$. Then, the GenCam algorithm calculates $h=g^x$ using the values of selected g, x, and outputs public key pkcam=(κ, g, h) and secret key skcam=x.

The Com algorithm will be described below. Public key pkcam=(κ, g, h) output from the GenCam algorithm and arbitrary message m_0 are input to the Com algorithm. The Com algorithm randomly selects element t from cyclic group $Z\_\kappa$, and calculates commitment $C=g^{\{H(m\_0)\}}h^t$, using the value of element t and the values of g, h included in public key pkcam. The Com algorithm outputs random number t and commitment C.

The Cam algorithm will be described below. Public key pkcam and secret key skcam which are generated by the GenCam algorithm, random number t and commitment C which are generated by the Com algorithm, and message m are input to the Cam algorithm. Function Cam selects element r that satisfies $H(m\_0)+tx=H(m)+rx \bmod q\_\kappa$ from the elements of $Z\_\kappa$, using those input values. The Cam algorithm outputs random number r.

Finally, the ComVer algorithm will be described below. Public key pkcam=(κ, g, h), message m, and random number r are input to the ComVer algorithm. The ComVer algorithm calculates commitment $C=g^{\{H(m)\}}h^r$, using those input values. The ComVer algorithm outputs commitment C.

Examples of the electronic signature system according to the present exemplary embodiment will be described below.

1st Example

The system of an arbitrary electronic signature scheme which satisfies the unforgeability is represented by Σ'. A key generating algorithm of system Σ' is represented by Gen', a signature algorithm thereof by Sig', and a verification algorithm thereof by Ver'.

The system of a chameleon commitment scheme is represented by Δ. The algorithms of respective functions of system Δ are represented by GenCam, Com, Cam, ComVer, respectively.

The system of an electronic signature scheme which satisfies the strong unforgeability according to the first example is represented by Σ. A key generating algorithm of system Σ is represented by Gen, a signature algorithm thereof by Sig, and a verification algorithm thereof by Ver.

Figure 3:
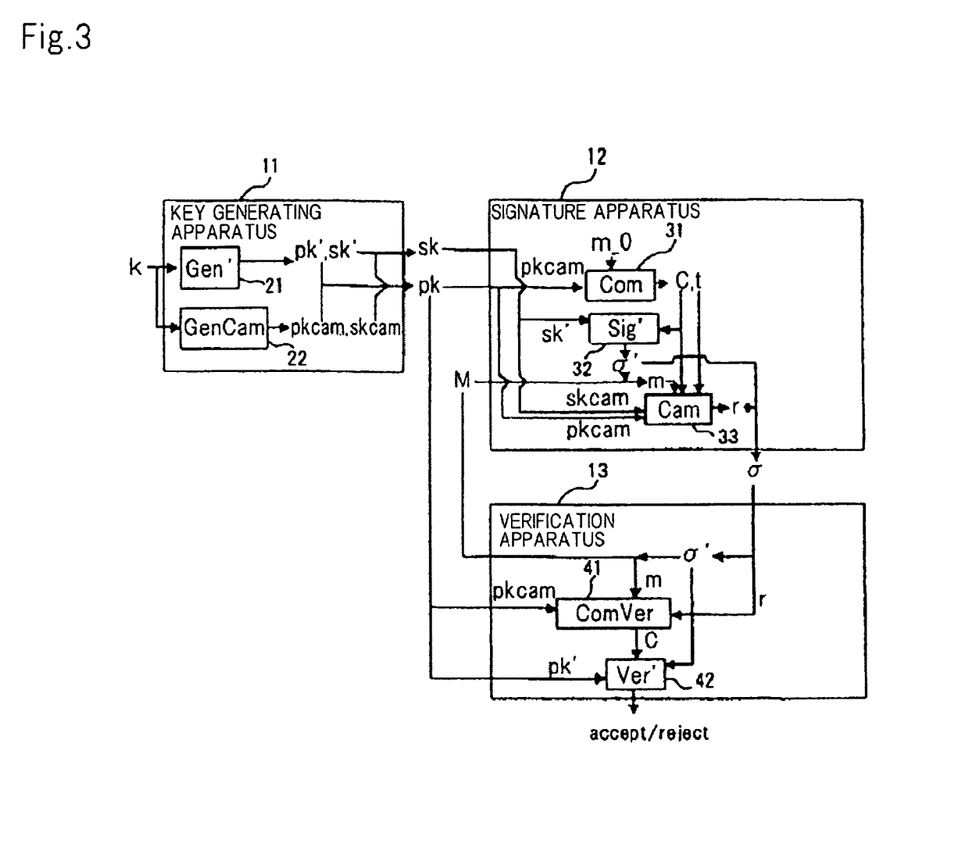
FIG. 3 is a block diagram showing the configurations of respective apparatus according to a first example.

FIG. 3 is a block diagram showing the configurations of respective apparatus according to the first example. As shown in FIG. 3, key generating apparatus 11 includes Gen' section 21 and GenCam section 22. Signature apparatus 12 includes Com section 31, Sin' section 32, and Cam section 33. Verification apparatus 13 includes ComVer section 41 and Ver' section 42.

In key generating apparatus 11, Gen' section 21 executes key generating algorithm Gen' of system Σ' of the electronic signature scheme which satisfies the unforgeability to generate public key pk' and secret key sk', using security parameter κ as an input. GenCam section 22 executes the algorithm of function GenCam to generate public key pkcam and secret key skcam, using security parameter κ as an input.

The set of public key pk' generated by Gen' section 21 and public key pkcam generated by GenCam section 22 is output as public key pk of key generating algorithm Gen carried out by key generating apparatus 11. The set of secret key sk' generated by Gen' section 21 and secret key skcam generated by GenCam section 22 is output as secret key sk of key generating algorithm Gen carried out by key generating apparatus 11.

In signature apparatus 12, Com section 31 executes the algorithm of function Com to generate commitment C and random number t, using public key pkcam included in public key pk and arbitrary message m_0 as inputs. Sig' section 32 executes signature algorithm Sig' of system Σ' of the electronic signature scheme which satisfies the unforgeability to generate electronic signature σ', using commitment C generated by Com section 31 and secret key sk' included in secret key sk as inputs. Cam section 33 executes the algorithm of function Cam to generate random number r, using message m which comprises message M for which an electronic signature is to be generated and electronic signature σ', commitment C and random number t which are generated by Com section 31, and public key pkcam and secret key skcam as inputs.

A bit sequence including electronic signature σ' generated by Sig' section 32 and random number r generated by Cam section 33 is output as electronic signature σ of signature algorithm Sig carried out by signature apparatus 12.

In verification apparatus 13, ComVer section 41 executes ComVer algorithm to generate commitment C, using electronic signature σ' and random number r which are included in electronic signature s, message m made up of message M and electronic signature σ', and public key pkcam included in public key pk as inputs. Ver' section 42 executes verification algorithm Ver' of system Σ' of the electronic signature scheme which satisfies the unforgeability to output "accept" and "reject" as indicating the verified result, using commitment C generated by ComVer section 41, public key pk' included in public key pk, and electronic signature σ' included in electronic signature σ as inputs.

Operation of an electronic signature system according to a first exemplary embodiment will be described below.

Figure 4:
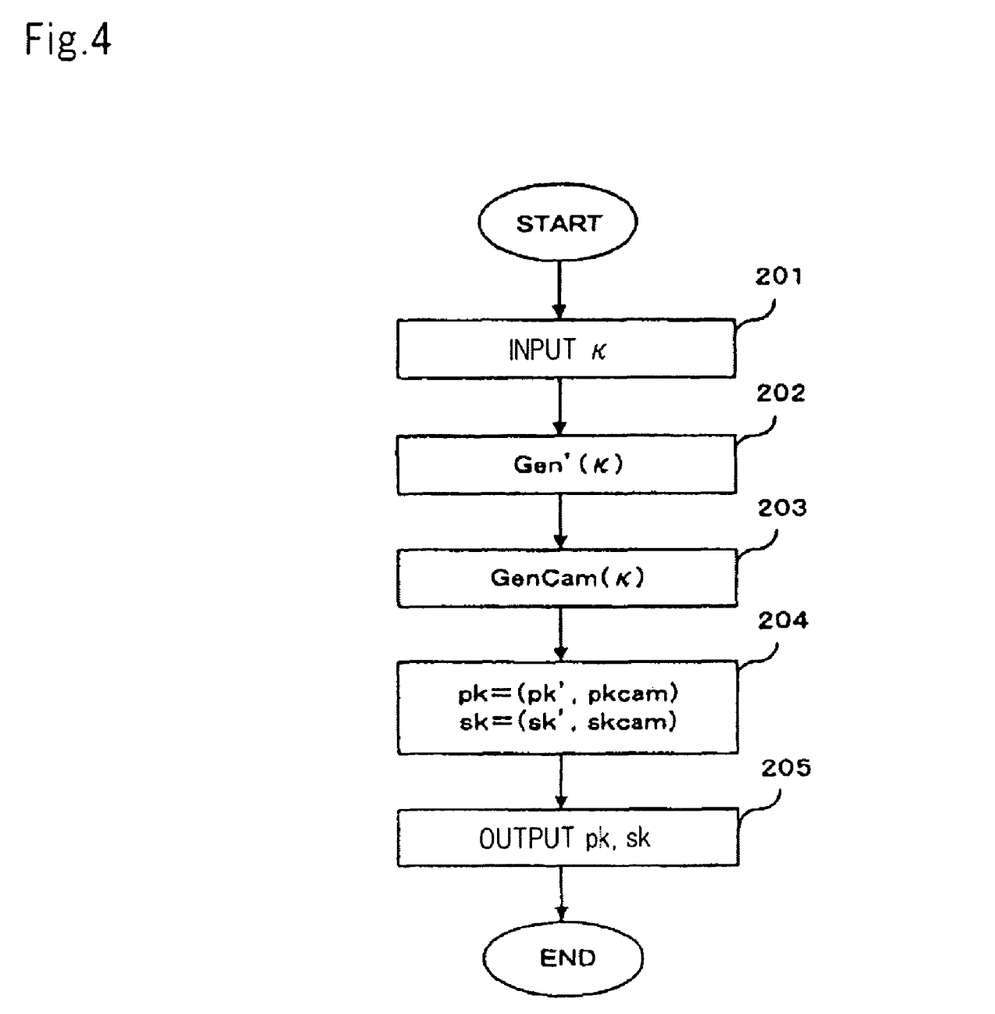
FIG. 4 is a flowchart showing the operational sequence of key generating algorithm Gen carried out by key generating apparatus 11 according to a first exemplary embodiment.

FIG. 4 is a flowchart showing the operational sequence of key generating algorithm Gen carried out by key generating apparatus 11 according to the first exemplary embodiment. As shown in FIG. 4, key generating apparatus 11 reads input κ from the storage (step 201). Then, key generating apparatus 11 executes Gen'(κ) to calculate outputs (pk, sk) from Gen'(κ) (step 202). Then, key generating apparatus 11 executes Gen-Cam(κ) to calculate outputs (pkcam, skcam) from GenCam (κ) (step 203). Then, key generating apparatus 11 generates public key pk=(pk', pkcam) and secret key sk=(sk', skcam) (step 204). Finally, key generating apparatus 11 writes public key pk and secret key sk in the storage (step 205).

Figure 5:
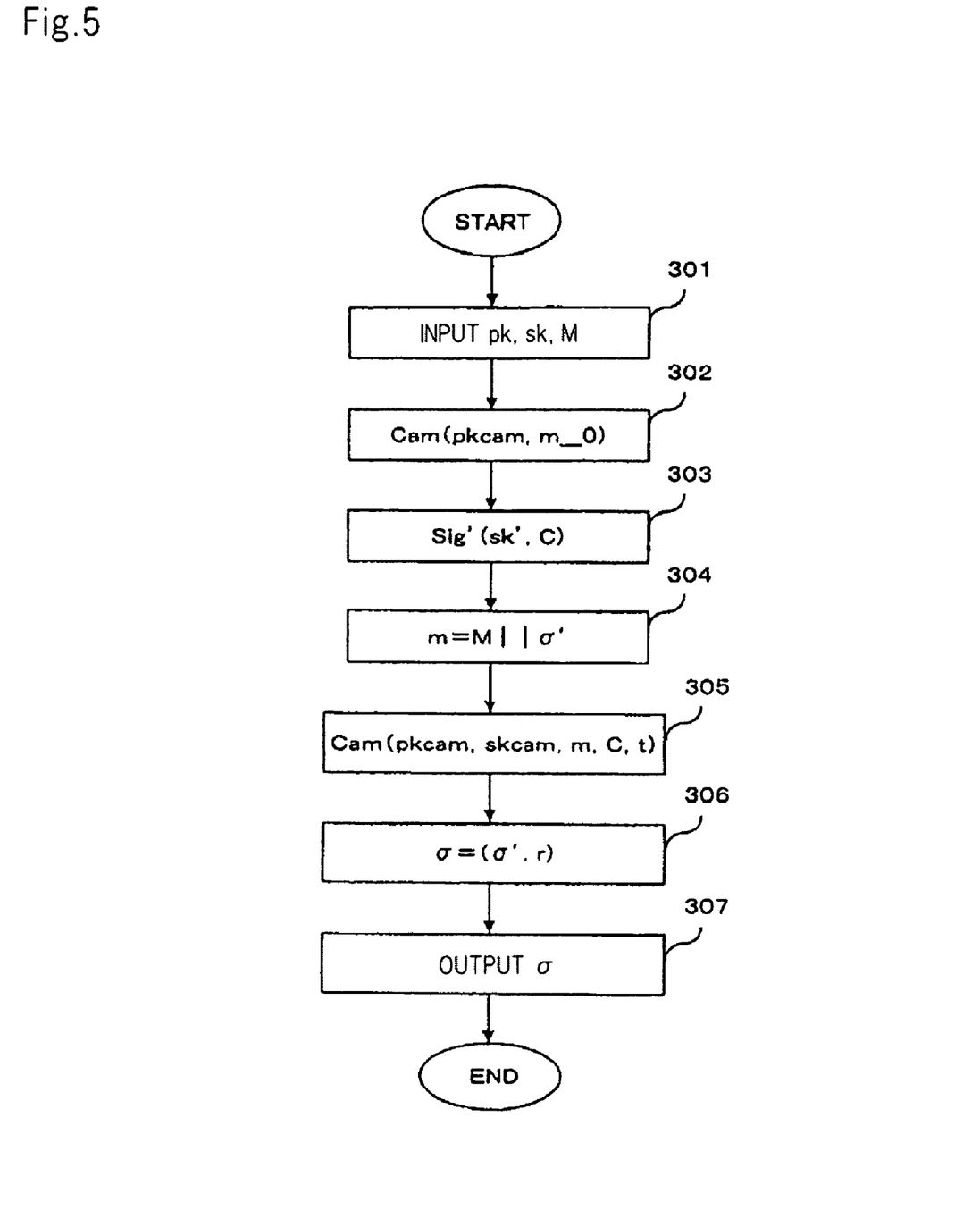
FIG. 5 is a flowchart showing the operational sequence of signature algorithm Sig carried out by signature apparatus 12 according to the first exemplary embodiment.

FIG. 5 is a flowchart showing the operational sequence of signature algorithm Sig carried out by signature apparatus 12 according to the first exemplary embodiment. A bit sequence that is produced by joining bit sequence M and bit sequence to each other is represented by M||σ. As shown in FIG. 5, signature apparatus 12 reads public key pk=(pk', pkcam), secret key sk=(sk', skcam), and message M from the storage (step 301). Then, signature apparatus 12 executes Com(pkcam, m_0) to calculate outputs (C, t) from Com(pkcam, m_0) (step 302). Then, signature apparatus 12 executes Sig'(sk', C) to calculate output σ' from Sig'(sk', C) (step 303). Then, signature apparatus 12 sets m=M||σ'(step 304). Then, signature apparatus 12 executes Cam(pkcam, skcam, m, C, t) to calculate output r from Cam(pkcam, skcam, m, C, t) (step 305). Then, signature apparatus 12 sets σ=(σ', r) (step 306). Then, signature apparatus 12 writes electronic signature a in the storage (step 307).

Figure 6:
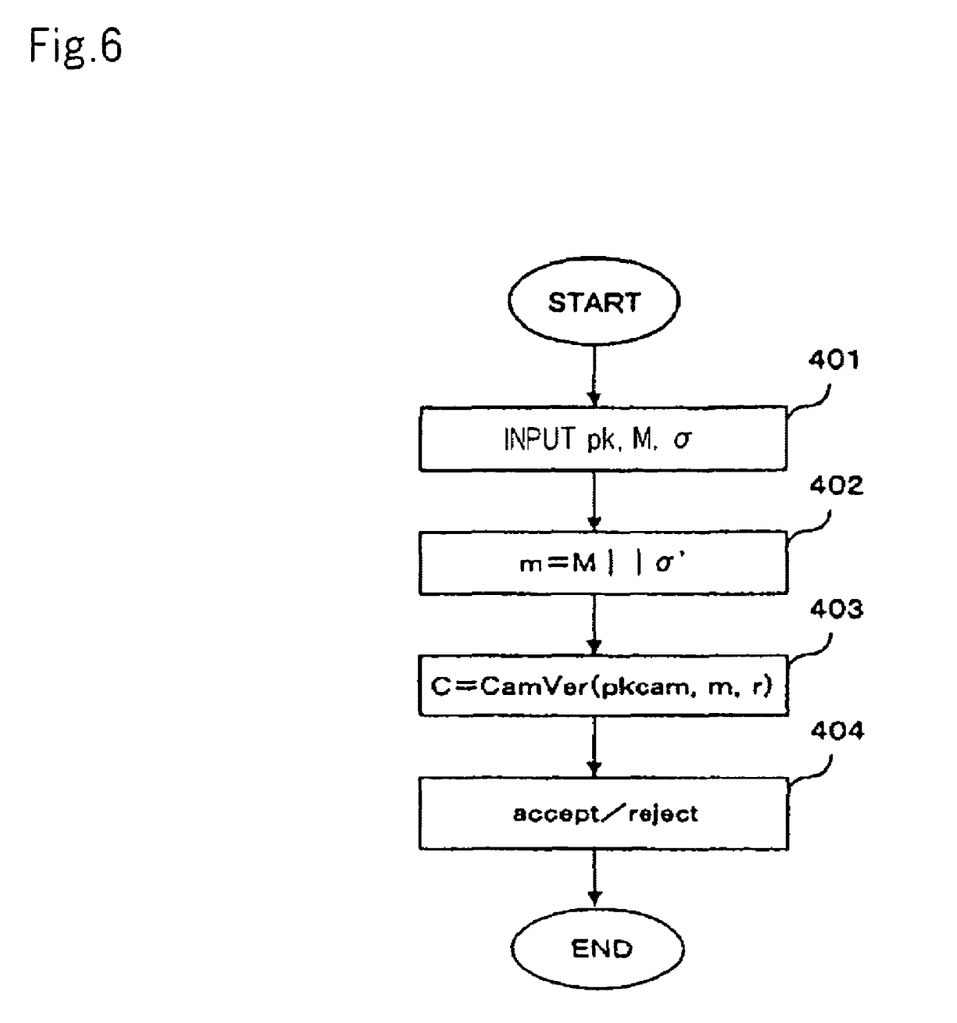
FIG. 6 is a flowchart showing the operational sequence of verification algorithm Ver carried out by verification apparatus 13 according to the first exemplary embodiment.

FIG. 6 is a flowchart showing the operational sequence of verification algorithm Ver carried out by verification apparatus 13 according to the first exemplary embodiment. As shown in FIG. 6, verification apparatus 13 reads public key pk=(pk', pkcam), message M, and electronic signature σ=(σ', r) from the storage (step 401). Then, verification apparatus 13 sets m=M||σ' (step 402). Then, verification apparatus 13 calculates C=ComVer(pkcam, m, r) (step 403). Finally, if Ver' (pk, C, σ')=accept, then verification apparatus 13 writes "accept" in the storage, and if otherwise, then verification apparatus 13 writes "reject" in the storage (step 404).

According to the present example, as described above, signature apparatus 12 generates commitment C and random number t according to the Com algorithm of system Δ of the chameleon commitment scheme, using the public key pkcam of system Δ. Signature apparatus 12 also generates electronic signature σ' according to signature algorithm Sig' of system Σ' which satisfies the unforgeability, using secret key sk' of system Σ'. Signature apparatus 12 also generates random number r according to the Cam algorithm of system Δ, using message m including message M with electronic signature s' added thereto, commitment C, random number t, public key pkcam, and secret key skcam. Signature apparatus 12 also combines electronic signature σ' and random number r into electronic signature σ. Accordingly, an electronic signature scheme which satisfies the strong unforgeability can be realized by combining an arbitrary electronic signature scheme which satisfies the unforgeability and the chameleon commitment scheme.

2nd Example

According to the first example, an electronic signature scheme which satisfies the strong unforgeability is obtained from an arbitrary chameleon commitment scheme. A second example represents a special version of the first example.

The arbitrary chameleon commitment scheme in the first example may be an existing scheme. However, from the standpoint of security, higher security is achieved by employing a chameleon commitment scheme (GanCam_n, Com_n, Cam_n, ConVer_n) according to the second example to be described below.

The chameleon commitment scheme according to the second example is realized by respective algorithms GanCam_n, Com_n, Cam_n, ConVer_n where n indicates an integer.

An electronic signature system according to the second example is identical in configuration to the electronic signature system according to the first example shown in FIG. 3. The second example is different from the first example only as to the algorithms of the chameleon commitment scheme which are executed by key generating apparatus 11, signature apparatus 12, and verification apparatus 13.

The algorithms GanCam_n, Com_n, Cam_n, ConVer_n of chameleon commitment scheme will be described below.

Figure 7:
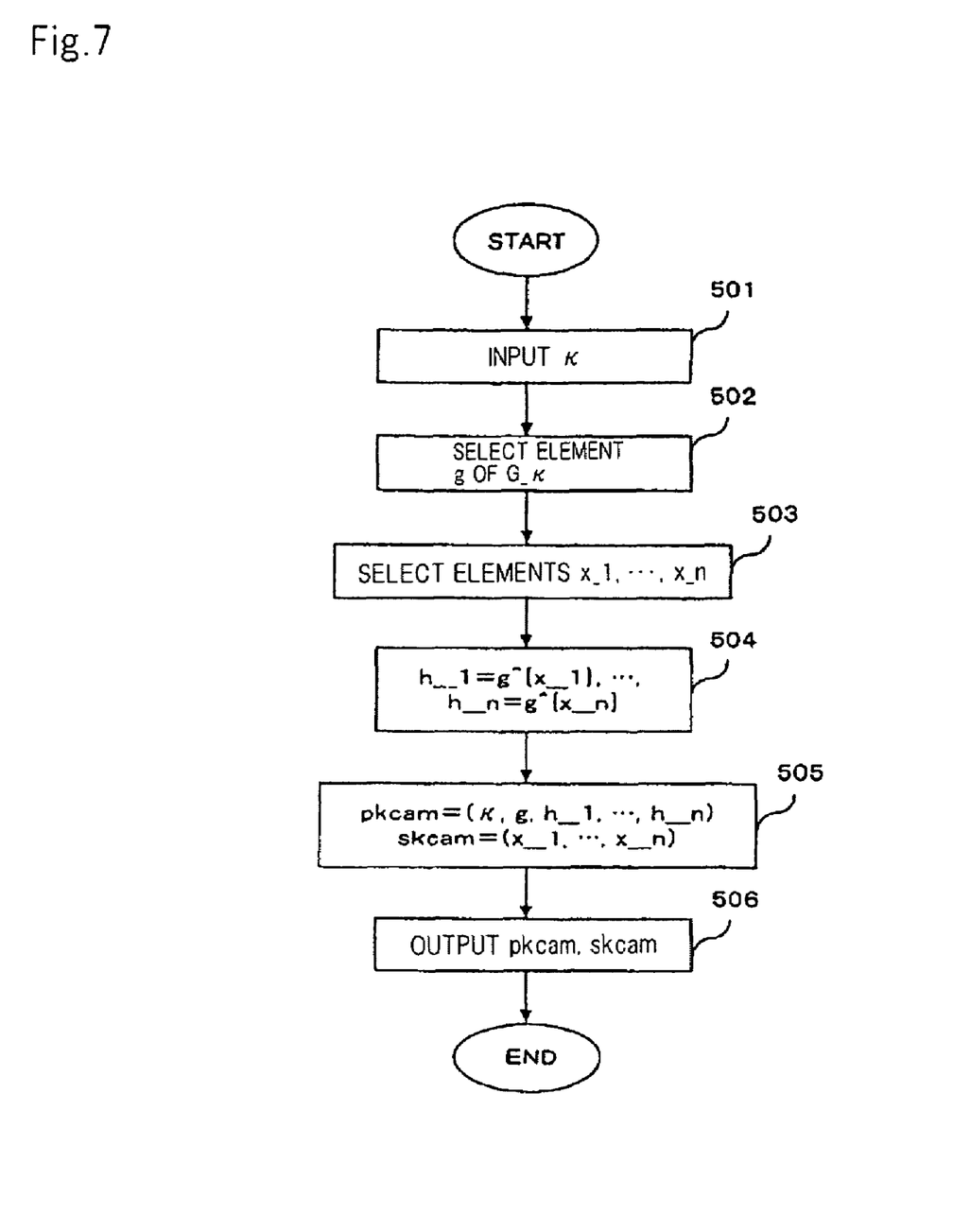
FIG. 7 is a flowchart showing the operational sequence of a GenCam_n algorithm carried out by key generating apparatus 11 according to a second example.

FIG. 7 is a flowchart showing the operational sequence of the GenCam_n algorithm carried out by key generating apparatus 11 according to the second example. As shown in FIG. 7, key generating apparatus 11 reads input κ from the storage (step 501). Then, key generating apparatus 11 randomly selects element g of G_κ (step 502). Then, key generating apparatus 11 randomly selects elements $x\_1, \ldots, x\_n$ of $Z\_k$ (step 503). Then, key generating apparatus 11 sets $h\_1=g^{\{x\_1\}}, \ldots, h\_n=g^{\{x\_n\}}$ (step 504). Then, key generating apparatus 11 sets pkcam=(κ, g, h\_1, ..., h\_n), skcam=(x\_1, ..., x\_n) (step 505). Finally, key generating apparatus 11 writes outputs (pkcam, skcam) in the storage (step 506).

Figure 8:
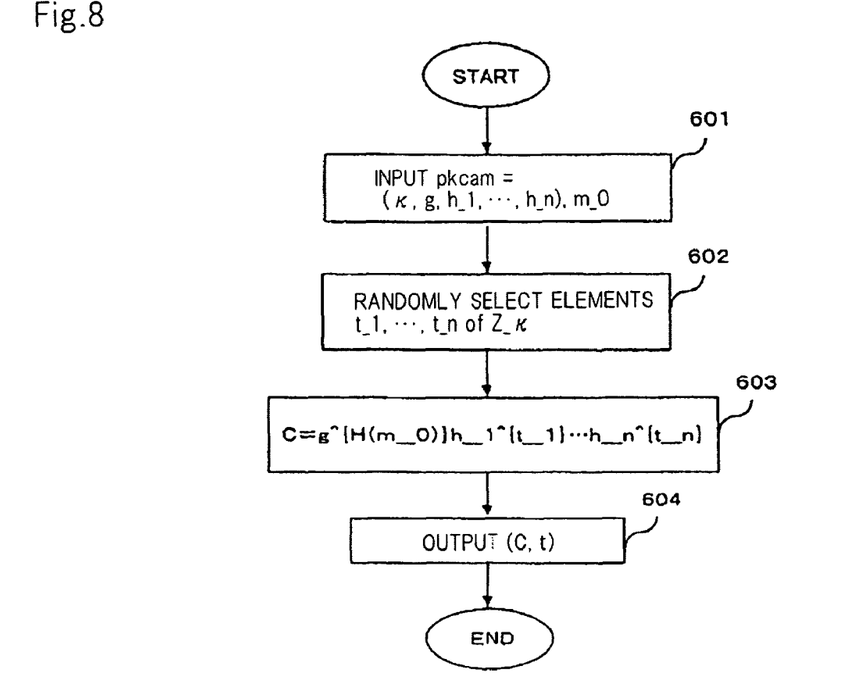
FIG. 8 is a flowchart showing the operational sequence of a Com_n algorithm carried out by signature apparatus 12 according to the second example.

FIG. 8 is a flowchart showing the operational sequence of the Com_n algorithm carried out by signature apparatus 12 according to the second example. As shown in FIG. 8, signature apparatus 12 reads inputs pkcam=(κ, g, h_1, ..., h_n), m_0 from the storage (step 601). Then, signature apparatus 12 selects elements t_1, ..., t_n of Z_κ, and sets t=(t_1, ..., t_n) (step 602). Then, signature apparatus 12 sets $C=g^{\{H(m\_0)\}} h\_1^{\{t\_1\}} \ldots h\_n^{\{t\_n\}}$ (step 603). Then, signature apparatus 12 writes outputs (C, t) in the storage (step 604).

Figure 9:
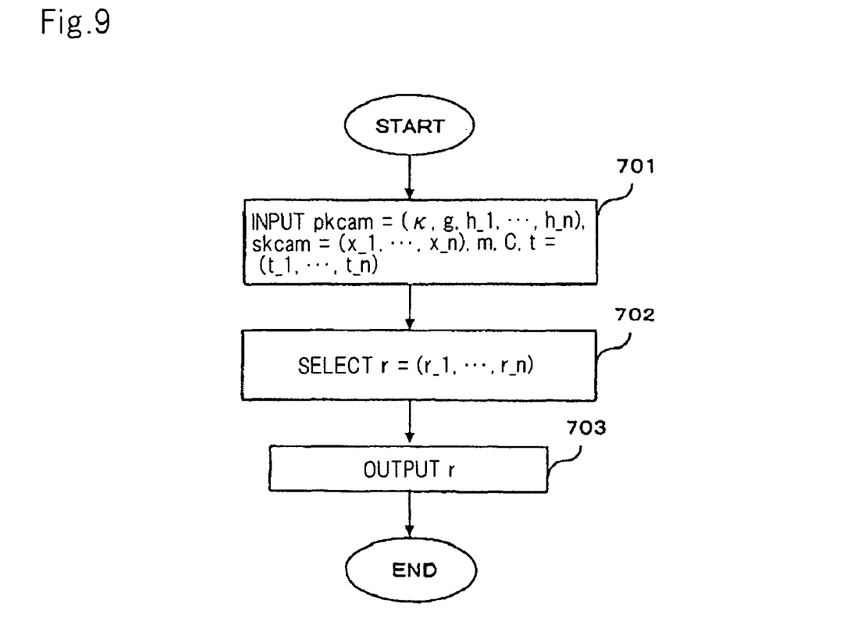
FIG. 9 is a flowchart showing the operational sequence of a Cam_n algorithm carried out by signature apparatus 12 according to the second example.

FIG. 9 is a flowchart showing the operational sequence of the Cam_n algorithm carried out by signature apparatus 12 according to the second example. As shown in FIG. 9, signature apparatus 12 reads inputs pkcam=(κ, g, h_1, ..., h_n), skcam=(x_1, ..., x_n), m, C, t=(t_1, ..., t_n) from the storage (step 701). Then, signature apparatus 12 selects an element which satisfies $H(m\_0)+t\_1x\_1+ \ldots +t\_nx\_n=H(m)+r\_1x\_1+\ldots+r\_nx\_n \mod q\_κ$ from the elements of Z_κ, and sets r=(r_1, ..., r_n) (step 702). Finally, signature apparatus 12 writes output r in the storage (step 703).

Figure 10:
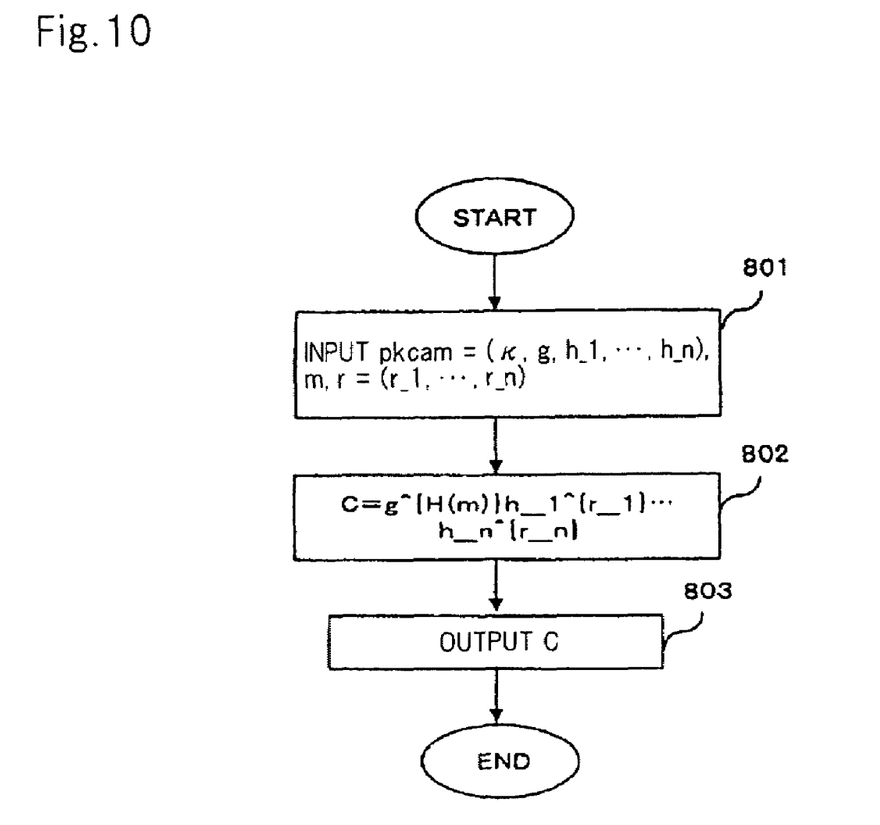
FIG. 10 is a flowchart showing the operational sequence of a ComVer_n algorithm carried out by verification apparatus 13 according to the second example.

FIG. 10 is a flowchart showing the operational sequence of the ComVer_n algorithm carried out by verification apparatus 13 according to the second example. As shown in FIG. 10, verification apparatus 13 reads inputs pkcam=(κ, g, h_1, ..., h_n), m, r=(r_1, ..., r_n) from the storage (step 801). Then, verification apparatus 13 sets $C=g^{\{H(m)\}}h\_1^{\{r\_1\}} \ldots h\_n^{\{r\_n\}}$ (step 802). Finally, verification apparatus 13 writes outputs C in the storage (step 803).

According to the second example, as described above, higher security is achieved because the expanded chameleon commitment scheme is employed.

3rd Example

According to a third example, the amount of calculations in the second embodiment is reduced. An electronic signature system according to the third example is identical in configuration to the electronic signature systems according to the first and second examples shown in FIG. 3. According to the third example, a Com'_n algorithm with a reduced amount of calculations is applied instead of the Com_n algorithm in the second example, and a Cam'_n algorithm with a reduced amount of calculations is applied instead of the Cam_n algorithm in the second example.

Figure 11:
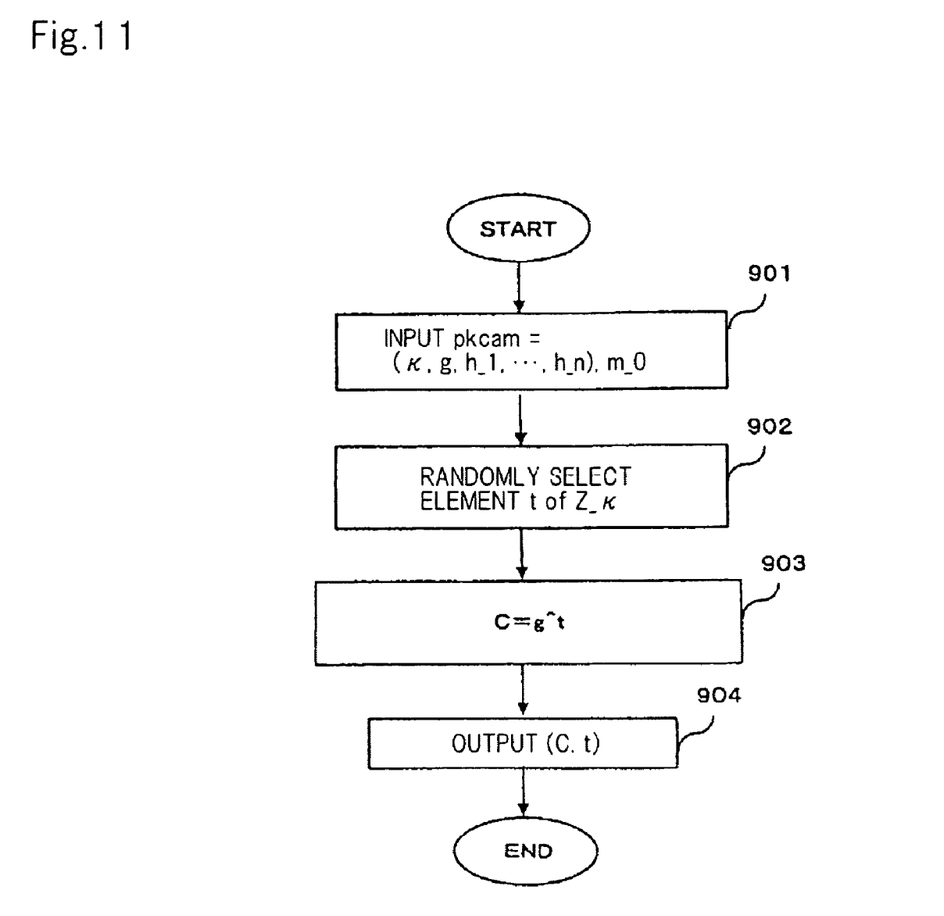
FIG. 11 is a flowchart showing the operational sequence of a Com'_n algorithm carried out by signature apparatus 12 according to a third example.

FIG. 11 is a flowchart showing the operational sequence of the Com'_n algorithm carried out by signature apparatus 12 according to the third example. As shown in FIG. 11, signature apparatus 12 reads inputs pkcam=(κ, g, h_1, ..., h_n), m_0 from the storage (step 901). Then, signature apparatus 12 randomly selects element t of Z_κ (step 902). Then, signature apparatus 12 sets $C=g^t$ (step 903). Finally, signature apparatus 12 writes outputs (C, t) in the storage (step 904).

Figure 12:
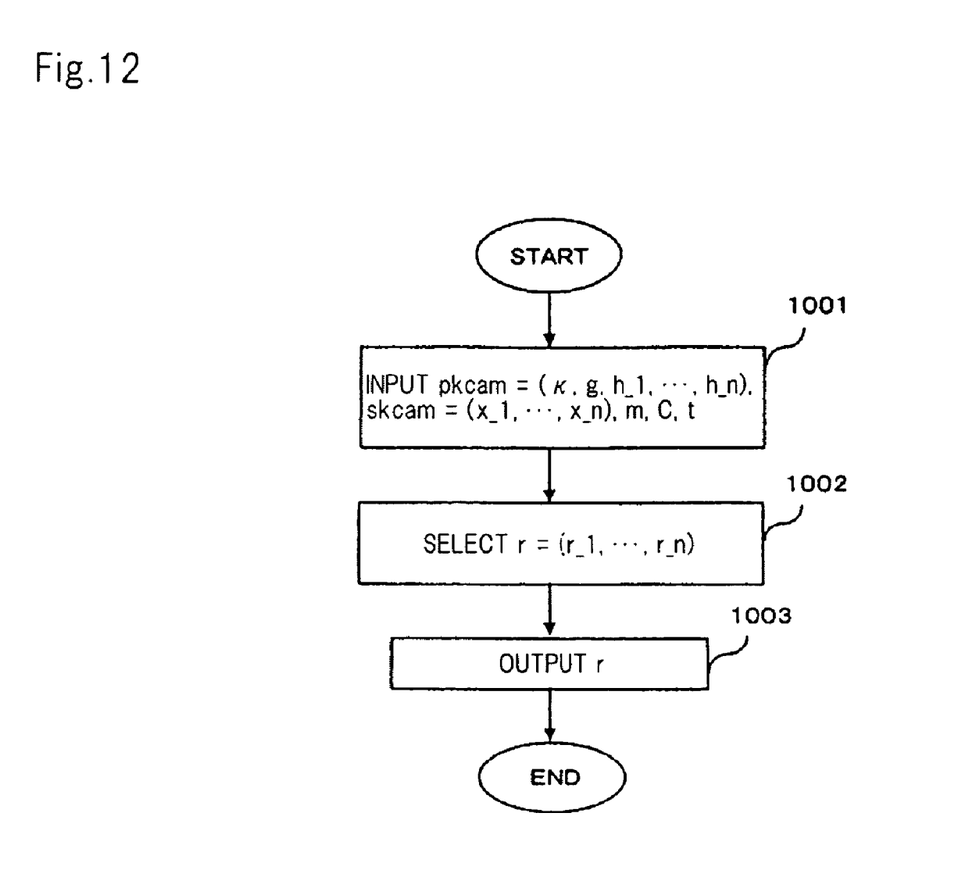
FIG. 12 is a flowchart showing the operational sequence of a Cam'_n algorithm carried out by signature apparatus 12 according to the third example.

FIG. 12 is a flowchart showing the operational sequence of the Cam'_n algorithm carried out by signature apparatus 12 according to the third example. As shown in FIG. 12, signature apparatus 12 reads pkcam=(κ, g, h_1, ..., h_n), skcam=(x_1, ..., x_n), m, C, t from the storage (step 1001). Then, signature apparatus 12 selects an element which satisfies $t=H(m)+r\_1x\_1+ \ldots +r\_nx\_n \mod q\_κ$ from elements r_1, ..., r_n of Z_κ, and sets r=(r_1 ... +r_n) (step 1002). Then, signature apparatus 12 sets writes output r in the storage (step 1003).

According to the third example, as described above, since the algorithms of the second example are simplified, the amount of calculations is reduced.

What is claimed is:

1. An electronic signature system for verifying the legitimacy of a target message with an electronic signature generated for the target message, comprising:

a key generating apparatus for generating a first public key and a first secret key according to a key generating algorithm of an electronic signature scheme which satisfies an unforgeability, using a predetermined security parameter as an input, and generating a second public key and a second secret key according to a GenCam algorithm of a chameleon commitment scheme, using the predetermined security parameter as an input;

a signature apparatus for generating a commitment and a first random number according to a Com algorithm of said chameleon commitment scheme, using said second public key generated by said key generating apparatus and an arbitrary message as inputs, generating a first signature according to a signature algorithm of the electronic signature scheme which satisfies the unforgeability, using said first secret key generated by said key generating apparatus as an input, generating a second random number according to a Cam algorithm of said chameleon commitment scheme, using a signature-affixed message which comprises said target message with said first signature affixed thereto, said second public key, said second secret key, said commitment, and said first random number as inputs, and generating an electronic signature for said target message, which includes said first signature and said second random number; and a verification apparatus for generating a commitment according to a ComVer algorithm of said chameleon commitment scheme, using the signature-affixed message which comprises said target message with said first signature affixed thereto that is included in said electronic signature, said second random number included in said electronic signature, and said second public key as inputs, verifying the legitimacy of the first signature according to a verification algorithm of the electronic signature scheme which satisfies the unforgeability, using the generated commitment, said first signature, and said first public key as inputs, and regarding a verified result as a verified result of said electronic signature.

2. The electronic signature system according to claim 1, wherein:

said key generating apparatus operates according to the GenCam algorithm of the chameleon commitment scheme to select element g from group G_k; where k represents the predetermined security parameter, randomly select n elements x_1, ..., x_n, where n represents a natural number, from cyclic group Z_k which is equal in order to group G_k; calculate $h\_1=g^{\{x\_1\}},\ldots,h\_n=g^{\{x\_n\}}$, include g, h_1, ..., h_n in said second public key, and include x_1, ..., x_n in said second secret key; and said signature apparatus operates according to said Com algorithm to select elements t_1, ..., t_n of cyclic group Z_k; and calculate said commitment $C=g^{\{H(m\_0)\}} h\_1^{\{t\_1\}} \ldots h\_n^{\{t\_n\}}$ using said arbitrary message m_0 and said t_1, ..., t_n, and operates according to said Cam algorithm to calculate hash value H(m) of said signature-affixed message m which comprises said target message with said first signature affixed thereto, select elements $r\_1, \ldots, r\_n$ which satisfy $H(m\_0)+t\_1 x\_1+\ldots+t\_nx\_n=H(m)+r\_1 x\_1+\ldots+r\_nx\_n \bmod q\_k$; from the elements of cyclic group $Z\_k$, and include said $r\_1, \ldots, r\_n$ in said second random number; and said verification apparatus operates according to said Com-Ver algorithm to calculate hash value $H(m)$ of said signature-affixed message m which comprises said target message with said first signature affixed thereto that is included in said electronic signature, and calculate said commitment $C=g^\{H(m)\} h\_1^\{r\_1\} \ldots h\_n^\{r\_n\}$.

3. The electronic signature system according to claim 1, wherein:

said key generating apparatus operates according to the GenCam algorithm of the chameleon commitment scheme to select element g from group $G\_k$; where k represents the predetermined security parameter, randomly select n elements $x\_1, \ldots, x\_n$, where n represents a natural number, from cyclic group $Z\_k$ which is equal in order to group $G\_k$, calculate $h\_1=g^\{x\_1\}, \ldots, h\_n=g^\{x\_n\}$, include $g, h\_1, \ldots, h\_n$ in said second public key, and include $x\_1, \ldots, x\_n$ in said second secret key;

said signature apparatus operates according to said Com algorithm to select element t of cyclic group $Z\_k$; and calculate said commitment $C=g^t$ using said arbitrary message $m\_0$ and said $t\_1, \ldots, t\_n$, and operates according to said Cam algorithm to calculate hash value $H(m)$ of said signature-affixed message m which comprises said target message with said first signature affixed thereto, select elements $r\_1, \ldots, r\_n$ which satisfy $H(m\_0)+t\_1 x\_1+\ldots+t\_nx\_n=H(m)+r\_1 x\_1+\ldots+r\_nx\_n \bmod q\_k$ from the elements of cyclic group $Z\_k$, and include said $r\_1, \ldots, r\_n$ in said second random number; and said verification number operates according to said Com-Ver algorithm to calculate hash value $H(m)$ of said signature-affixed message m which comprises said target message with said first signature affixed thereto that is included in said electronic signature, and calculate said commitment $C=g^\{H(m)\} h\_1^\{r\_1\} \ldots h\_n^\{r\_n\}$.

4. An electronic signature system, for verifying the legitimacy of a target message with an electronic signature generated for the target message, comprising: a key generating apparatus, for generating a public key and a secret key, comprising: a generating section for generating a first public key to be included in said public key, and a first secret key to be included in said secret key according to a key generating algorithm of an electronic signature scheme which satisfies an unforgeability, using a predetermined security parameter as an input; and a GenCam section for generating a second public key to be included in said public key and a second secret key to be included in said secret key according to a GenCam algorithm of a chameleon commitment scheme, using the predetermined security parameter as an input;

wherein said GenCam section operates according to the GenCam algorithm of said chameleon commitment scheme to select element g from group $G\_k$; where k represents the predetermined security parameter, randomly select n elements $x\_1, \ldots, x\_n$, where n represents a natural number, from cyclic group $Z\_k$ which is equal in order to group $G\_k$; calculate $h\_1=g^\{x\_1\}, \ldots, h\_n=g^\{x\_n\}$, include $g, h\_1, \ldots, h\_n$ in said second public key, and include $x\_1, \ldots, x\_n$ in said second secret key;

a signature apparatus, for generating an electric signature using the public key and the secret key generated by the key generating apparatus, comprising: a Com section for generating a commitment and a first random number according to a Corn algorithm of said chameleon commitment scheme, using said second public key, generated by said key generating apparatus and included in said public key, and an arbitrary message as inputs;

a signature section for generating a first signature according to a signature algorithm of the electronic signature scheme which satisfies the unforgeability, using said first secret key, generated by said key generating apparatus and included in said secret key, as an input; and a cam section for generating a second random number according to a Cam algorithm of said chameleon commitment scheme, using a signature-affixed message which comprises said target message with said first signature affixed thereto, said second public key included in said public key, said second secret key included in said secret key, said commitment, and said first random number as inputs, and generating an electronic signature for said target message, which includes said first signature and said second random number.

5. The electronic signature system as set forth in claim 4, wherein: said Com section generates the commitment and the first random number according to the Com algorithm of said chameleon commitment scheme by selecting elements $t\_1, \ldots, t\_n$ of cyclic group $Z\_k$ and calculating said commitment $C=g^\{H(m\_0)\}h\_1^\{t\_1\} \ldots h\_n^\{t\_n\}$ using said arbitrary message $m\_0$ and said $t\_1, \ldots, t\_n$; and said Cam section generates the second random number according to said Cam algorithm of said chameleon commitment scheme by calculating hash value $H(m)$ of said signature-affixed message m which comprises said target message with said first signature affixed thereto, selecting elements $r\_1, \ldots, r\_n$ which satisfy $H(m\_0)+t\_1 x\_{-1}+\ldots+t\_nx\_n=H(m)+r\_1 x\_1+\ldots+r\_nx\_n \bmod q\_k$ from the elements of cyclic group $Z\_k$, and including said $r\_1, \ldots, r\_n$ in said second random number.

6. The electronic signature system as set forth in claim 4, wherein: said Com section generates the commitment and the first random number according to the Com algorithm of said chameleon commitment scheme by selecting element t of cyclic group $Z\_k$; and calculating said commitment $C=g^t$ using said arbitrary message $m\_O$ and said $t\_1, \ldots, t\_n$; and said Cam section generates the second random number according to said Cam algorithm of said chameleon commitment scheme by calculating hash value $H(m)$ of said signature-affixed message m which comprises said target message with said first signature affixed thereto, selecting elements $r\_1, \ldots, r\_n$ which satisfy $H(m\_O)+t\_1 x\_{-1}+\ldots+t\_nx\_n=H(m)+r\_1 x\_1+\ldots+r\_nx\_n \bmod q\_k$; from the elements of cyclic group $Z\_k$, and including said $r\_1, \ldots, r\_n$ in said second random number.

7. The electronic signature system as set forth in claim 4, further comprising: a verification apparatus, for verifying the electronic signature generated by the signature apparatus comprising: a ComVer section for generating a commitment according to a ComVer algorithm of said chameleon commitment scheme, using the signature-affixed message which comprises said target message with said first signature affixed thereto that is included in said electronic signature, said second random number included in said electronic signature, and said second public key as inputs; and a verifying section for verifying the legitimacy of the first signature according to a verification algorithm of the electronic signature scheme which satisfies the unforgeability, using the commitment generated by said ComVer section, said first signature, and said first public key as inputs, and regarding a verified result as a verified result of said electronic signature.

8. The electronic signature system as set forth in claim 7, wherein: said Com section generates the commitment and the first random number according to the Com algorithm of said chameleon commitment scheme by selecting elements $t\_1, \ldots, t\_n$ of cyclic group $Z\_k$; and calculating said commitment $C=g^{\{H(m\_0)\}}h\_1^{\{t\_1\}} \ldots h\_n^{\{t\_n\}}$ using said arbitrary message $m\_0$ and said $t\_1, \ldots, t\_n$; and said Cam section generates the second random number according to said Cam algorithm of said chameleon commitment scheme by calculating hash value $H(m)$ of said signature-affixed message m which comprises said target message with said first signature affixed thereto, selecting elements $r\_1, \ldots, r\_n$ which satisfy $H(m\_0)+t\_1\ x\_1+ \ldots +t\_nx\_n=H(m)+r\_1\ x\_1+ \ldots +r\_nx\_n\ mod q\_k$; from the elements of cyclic group $Z\_k$, and including said $r\_1, \ldots, r\_n$ in said second random number, wherein said ComVer section generates the commitment according to the ComVer algorithm of said chameleon commitment scheme by calculating hash value $H(m)$ of said signature-affixed message m which comprises said target message with said first signature affixed thereto that is included in said electronic signature, and calculating said commitment $C=g^{\{H(m)\}}\ h\_1^{\{r\_1\}} \ldots h\_n^{\{r\_n\}}$.

9. The electronic signature system as set forth in claim 7, wherein: said Com section generates the commitment and the first random number according to the Com algorithm of said chameleon commitment scheme by selecting element t of cyclic group $Z\_k$; and calculating said commitment $C=g^t$ using said arbitrary message $m\_0$ and said $t\_1, \ldots, t\_n$; and said Cam section generates the second random number according to said Cam algorithm of said chameleon commitment scheme by calculating hash value $H(m)$ of said signature-affixed message m which comprises said target message with said first signature affixed thereto, selecting elements $r\_1, \ldots, r\_n$ which satisfy $H(m\_0)+t\_1\ x\_1+ \ldots +t\_nx\_n=H(m)+r\_1\ x\_1+ \ldots +r\_nx\_n\ mod q\_k$; from the elements of cyclic group $Z\_k$, and including said $r\_1, \ldots, r\_n$ in said second random number, wherein said ComVer section generates the commitment according to the ComVer algorithm of said chameleon commitment scheme by calculating hash value $H(m)$ of said signature-affixed message m which comprises said target message with said first signature affixed thereto that is included in said electronic signature, and calculating said commitment $C=g^{\{H(m)\}}h\_1^{\{r\_1\}} \ldots h\_n^{\{r\_n\}}$.

10. A method of verifying an electronic signature in an electronic signature system in which a verification apparatus verifies an electronic signature which is generated for a target message by a signature apparatus using a key generated by a key generating apparatus, comprising:

operating a key generating apparatus to generate a first public key and a first secret key according to a key generating algorithm of an electronic signature scheme which satisfies an unforgeability, using a predetermined security parameter as an input, and generate a second public key and a second secret key according to a GenCam algorithm of a chameleon commitment scheme, using the predetermined security parameter as an input;

operating a signature apparatus to generate a commitment and a first random number according to a Com algorithm of said chameleon commitment scheme, using said second public key generated by said key generating apparatus and an arbitrary message as inputs, generate a first signature according to a signature algorithm of the electronic signature scheme which satisfies the unforgeability, using said first secret key generated by said key generating apparatus as an input, generate a second random number according to a Cam algorithm of said chameleon commitment scheme, using a signature-affixed message which comprises said target message with said first signature affixed thereto, said second public key, said second secret key, said commitment, and said first random number as inputs, and generate an electronic signature for said target message, which includes said first signature and said second random number; and operating a verification apparatus to generate a commitment according to a ComVer algorithm of said chameleon commitment scheme, using the signature-affixed message which comprises said target message with said first signature affixed thereto that is included in said electronic signature, said second random number included in said electronic signature, and said second public key as inputs, verify the legitimacy of the first signature according to a verification algorithm of the electronic signature scheme which satisfies unforgeability, using the generated commitment, said first signature, and said first public key as inputs, and regarding a verified result as a verified result of said electronic signature.

\* \* \* \* \*